Oct. 14, 1969  A. S. LAMBURN ET AL  3,472,098

EPICYCLIC CHANGE-SPEED GEARING AND CONTROLS THEREFOR

Filed Oct. 30, 1967  4 Sheets-Sheet 1

INVENTORS
ALAN SALISBURY LAMBURN
RANDLE LESLIE ABBOTT
ERIC ALBERT WHATELEY
GEORGE KENNETH CLARK

BY:- Babcock Downing & Seebold
ATTORNEYs

INVENTORS
ALAN SALISBURY LAMBURN
RANDLE LESLIE ABBOTT
ERIC ALBERT WHATELEY
GEORGE KENNETH CLARK

BY: Damock, Downing Secheel
ATTORNEY

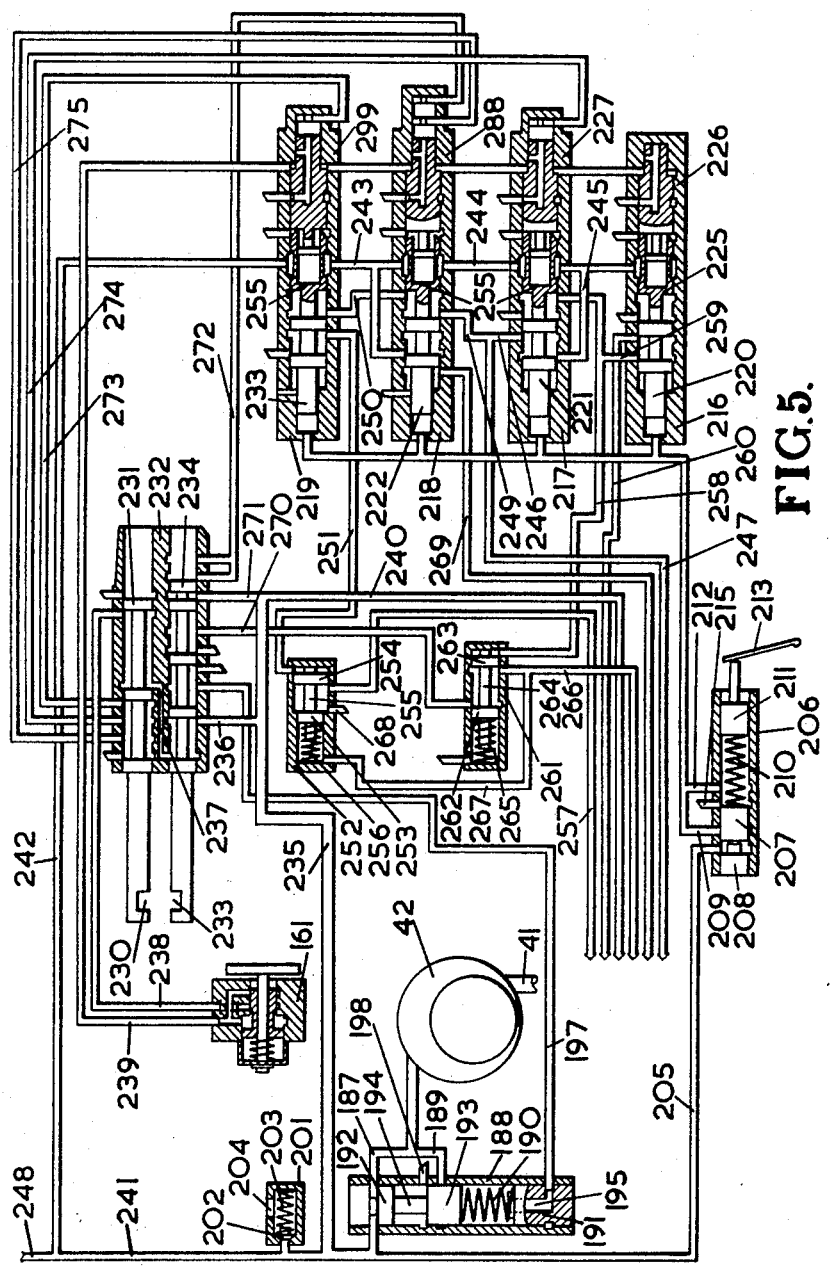

United States Patent Office 3,472,098
Patented Oct. 14, 1969

3,472,098
EPICYCLIC CHANGE-SPEED GEARING AND
CONTROLS THEREFOR
Alan Salisbury Lamburn, Kencott, via Lechlade, Randle
Leslie Abbott, Leamington Spa, Eric Albert Whateley,
Huddersfield, and George Kenneth Clark, Coventry,
England, assignors to Auto Transmissions Limited,
London, England
Filed Oct. 30, 1967, Ser. No. 679,128
Claims priority, application Great Britain, Nov. 1, 1966,
48,801/66
Int. Cl. F16h 57/10
U.S. Cl. 74—761                                    11 Claims

ABSTRACT OF THE DISCLOSURE

An epicyclic change-speed gearing providing five forward and one reverse drive ratios, has five epicyclic elements. The first is conected to a output shaft, the second and third are optionally clutchable to an input shaft, the fourth is brakable to rest and the fifth may be optionally clutched to the input shaft, braked to rest or released. A first planet meshes with the fifth element and drives a coaxial second planet which meshes with a third planet. The latter meshes with the third and fourth elements and drives a coaxial fourth planet which meshes with the second element.

---

The invention relates to an epicyclic change-speed gearing for a motor vehicle and controls therefor. It is applicable perticularly, but not exclusively, to a change-speed gearing for a motor vehicle providing five forward and one reverse drive ratios and in which the occurrence of ratios changes may be selected optionally by the driver or may be effected automatically.

An object of the invention is to provide a cheaper change-speed gearing providing five forward and one reverse drive ratios.

According to one aspect of the invention, an epicyclic change-speed gearing includes a power input shaft, a power output shaft, a first epicyclic element arranged for driving the power output shaft, second and third epicyclic elements arranged to be clutched optionally to the power input shaft, a fourth epicyclic element arranged to be braked optionally to a stationary element, a fifth epicyclic element arranged so that it may be optionally connected to the power input shaft or to a stationary element or may be disconnected from both the power input shaft and the stationary element, a first planet gear meshing with the fifth epicyclic element, a second planet gear coaxial with the first planet gear and drivingly connected thereto, a third planet gear meshing with the second planet gear and the third epicyclic element, a fourth planet gear coaxial with the third planet gear and drivingly connected thereto and the fourth planet gear meshing with the second epicyclic element, and the fourth epicyclic element meshes with the third or the fourth planet gear.

According to a feature of the invention, the first epicyclic element may be a planet carrier means, the second and third epicyclic elements are sun gears, the fourth epicyclic element is an annulus gear and the fifth epicyclic element is a sun gear.

According to another feature the second epicyclic element may be clutched to the power input shaft by an over-run clutch arranged such that the second epicyclic element cannot rotate forwards faster than the power input shaft, and the over-run clutch is in parallel with an optionally engageable friction clutch.

According to a further feature the third epicyclic element may be clutched to the power input shaft by an over-run clutch which is optionally disengageabe whereby either the power input shaft may not rotate faster than the third epicyclic element in a forwards direction, or the over-run clutch is completely disengaged.

According to yet another feature, the fifth epicyclic element may be driven by an axially-movable friction engaging member arranged to be movable optionally between a first position, in which it is clutched to the power input shaft, and a second position in which it is disconnected from the power input shaft and in which it may be optionally braked to the stationary element. Preferably the elements for clutching the axially-movabe friction engaging member to the power input shaft constitute a frusto-conical clutch and preferably the elements for braking the axially-movable friction engaging member to the stationary element constitute a frusto-conical brake.

According to another feature of the invention, a reverse drive ration may be provided when the fifth epicyclic element is clutched to the power input shaft, the second and third epicyclic elements are disconnected from the power input shaft and the fourth epicyclic element is braked to the stationary element.

According to a further feature, the means for braking the fourth epicyclic element to the stationary element may include a first fluid pressure operable piston for generating a braking force and a second fluid pressure operable piston for generating a greater force in opposition to that generated by the first piston whereby the fourth epicyclic element may be braked by pressurising the first piston or may be unbraked by either unpressurising both pistons or by pressurising both pistons simultaneously.

According to another aspect of the invention the epicyclic change-speed gearing may be arranged to be operable to provide five forward drive ratios. Preferably the epicyclic change-speed gearing is arranged to be operable to provide five forward and one reverse drive ratios.

According to another aspect of the invention, a means to be operable by the driver of the vehicle may be arranged to be movable along a first length of track in which the means is engaged with a first fluid pressure selector valve whereby to move the latter between a sequence of positions each corresponding to the selection of a different gear drive ratio to a position in which the engagement of the various gear drive ratios are effected automatically, and a second length of track arranged through the latter position and transverse to the first length of track in which the means is movable out of engagement with the first fluid pressure selector valve and into engagement with a second fluid pressure selector valve, and a third length of track arranged parallel to the first length of track along which the means is movable to move the second fluid pressure selector valve between a sequence of positions in which neutral drive, reverse drive and the engagement of a parking lock are engaged in turn.

Other aspects of the invention will be appreciated from the following description and the accompanying drawings.

The invention will now be described, by way of example only, as applied to a change-speed gearing for a motor car and with reference to the accompanying drawings, in which:

FIGURE 5 is a diagrammatic illustration of a control system for the change-speed gearing.

Figure 1:
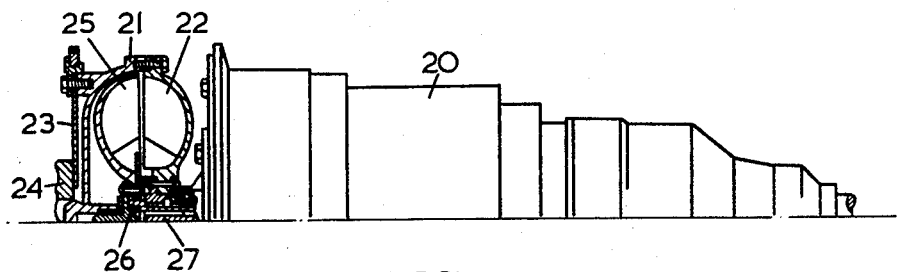
FIGURE 1 is an elevation of the change-speed gearing driven by a fluid coupling shown in section.

In FIGURE 1, the change-speed gearing 20 is driven by a typical fluid coupling 21 of which the impeller 22 is driven through a flexible drive plate 23 from an engine crank-shaft 24. The driven member 25 of the fluid coupling 21 is riveted to a flange formed integral with a sleeve 26 having internal splines which drivingly engage corresponding axially directed splines on the power input shaft 27 of the change-speed gearing 20.

Figure 2:
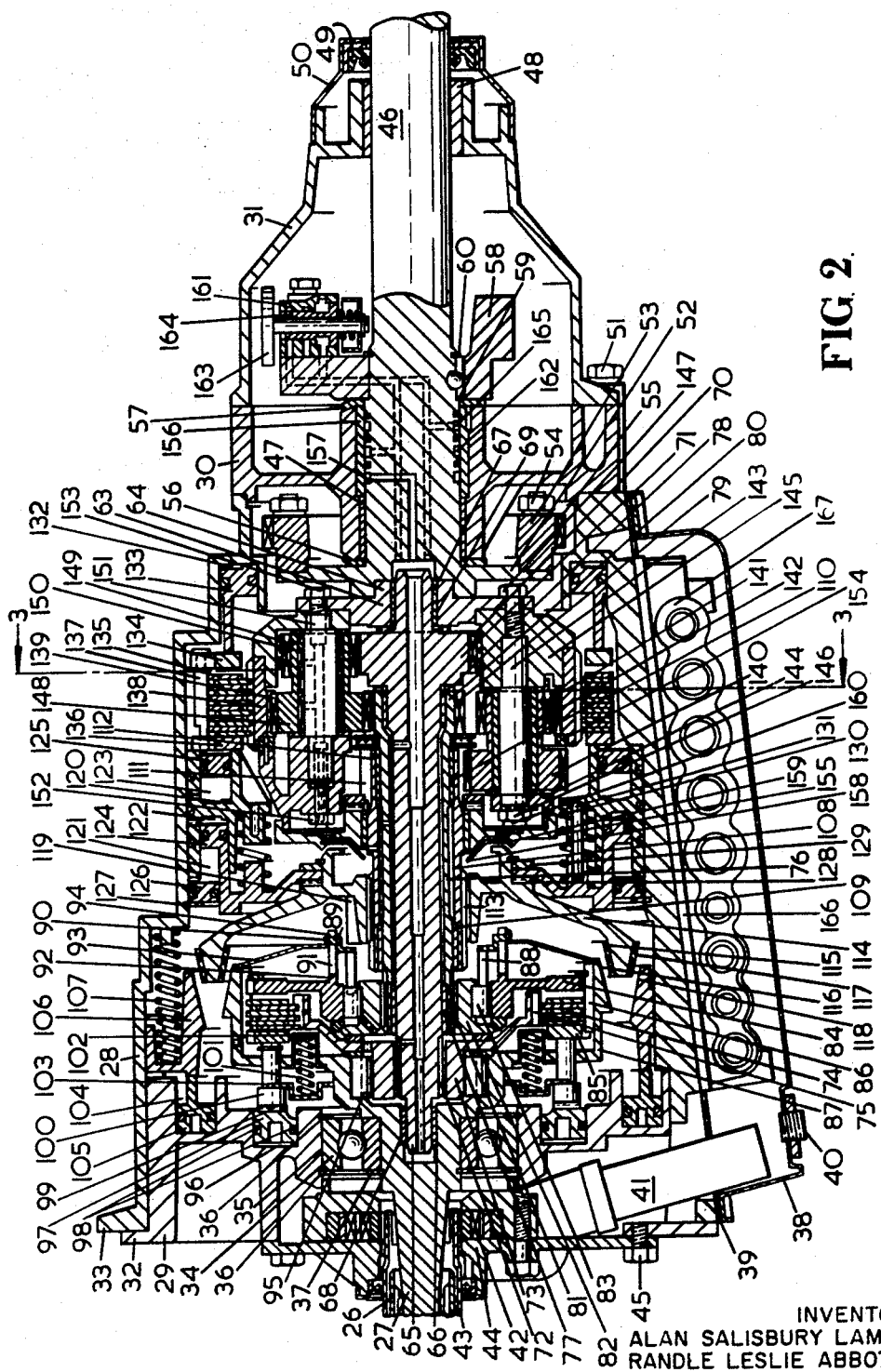
FIGURE 2 is a vertical section through the change-speed gearing.

In FIGURE 2, the change-speed gearing is enclosed by a main casing 28, a front diaphragm member 29, a rear diaphragm member 30 and a rear casing 31 all of which are formed of cast aluminium. The front diaphragm member 29 is a sliding fit in a bore in the main casing 28 and is axially located by an integrally formed flange 32 being trapped between a flange 33 formed integral with the main casing 28 and a corresponding flange of an unseen bell-housing which surrounds the fluid coupling 21 and is fastened to the engine at its front face and to the flange 33 at its rear face.

A ball race 34 is axially located in an axial bore 35 in the front diaphragm member 29 between spring clips 36 engaged in circumferential grooves in the bore 35. The ball race 34 supports the power input shaft 27 and axially locates it between a shoulder and a spring clip 37 engaged in a circumferential groove in the input shaft 27.

The lower face of the main casing 28 is closed by a pressed steel sump 38 for collecting operating oil. The sump is held by a ring of unseen studs and nuts and sealed to the main casing 28 by a gasket 39. It is drainable by a drain plug 40. The operating oil is drawn through a suction pipe 41 by a crescent type pump 42 of the type well known to those versed in the art, whose rotor is driven by a sleeve 43 fast with the impeller 22 of the fluid coupling 21. The pump 42 runs in a housing 44 which is held by screws 45 to the front diaphragm member 29.

A power output shaft 46 is supported for rotation in plain bearings 47 and 48 in the rear diaphragm member 30 and the rear casing 31 respectively. A lip type oil seal 49 acts between the rear casing 31 and the power output shaft 46, the seal 49 is held in a sheet steel pressing 50. The rear casing 31 is held to the main casing 28 by screws 51 which pass through, and trap, the rear diaphragm member 30. The front end of the power output shaft 46 is formed with an integral flange 52 to which a parking lock member 53 is held by studs and nuts 54. Teeth 55 formed in the periphery of the parking lock member 53 are engageable by an unseen pawl of the kind well known to those versed in the art.

The power output shaft 46 is axially located by a thrust bearing 56 between the flange 52 and the rear diaphragm member 30, and by a thrust bearing 57 between the rear diaphragm member 30 and a governor block 58. The latter is axially located between a shoulder 59 in the power output shaft 46 and a spring clip 60 engaged in a circumferential groove in the power output shaft 46. The governor block 58 is driven by a ball 61 partly engaged in a radial drilling in the power output shaft and partly engaged in an axially directed keyway 62 formed in the governor block 58. An unseen flange is fastened to the right hand end of the power output shaft 46 for connection to a transmission propellor shaft.

A steel disc 63 is radially located to the power output shaft 46 by a spigot 64 and is fastened to the flange 52 by three unseen nuts and studs screwed into three bosses, unseen in FIGURE 2, which are formed integral with the disc 63 and extend rearwards to the flange 52. A steel centre shaft 65 is supported by plain bearings 66, 67 held in axial bores 68, 69 formed in the power input shaft 27 and in the disc 63 respectively. The centre shaft 65 has a circumferential row of integrally formed helical gear teeth 70 to constitute a rear sun gear 71, being the third epicyclic element. The front end of the centre shaft 65 is formed with integral axially directed splines 72 drivingly engaging corresponding splines formed in a centre member 73 of a front multiplate clutch 74 whose driven plates have integral internally formed splines engaging corresponding axially directed splines 75 formed on the outside of the centre member 73.

A steel inner tube 76 is supported from the centre shaft 65 by bearings 77, 78 and is formed at its rear end with a circumferential row of integrally formed helical gear teeth 79 to constitute a centre sun gear 80, being the second epicyclic element. The front end of the inner tube 76 is formed with integral external axially directed splines 81 engaging corresponding splines formed in the inner member 82 of a disengageable over-run clutch 83 whose outer member constitutes a rear end plate 84 of the front multiplate clutch 74. A front end plate 85 and driving plates together with the rear end plate 84 of the clutch 74 are formed with axially directed external splines engaging corresponding splines 86 formed integral with the inner surface of a coaxial cylindrical extension 87 of the power input shaft 27.

The disengageable over-run clutch 83 has a cylindrical surface on the inner member, ramps formed on the internal surface of the outer member and rollers spring loaded circumferentially into engagement with the inner and outer members in the well-known manner. However, on the opposite side of each roller to the spring is a finger 88 formed integral with a steel ring 89 having four radially extending prongs 90 each engaging in one of four slots 91 formed in a coaxial cylindrical extension 92 of the rear end plate 84. The ring 89 is biased rearwards by a frusto-conical spring 93 against a spring clip 94 in a circumferential groove formed in the extension 92. The spring 93 reacts against the end of the cylinder 87. The circumferentially spaced faces of the slots 91 are formed at 45° to the axis such that they converge towards the front of the change-speed gearing 20 and are so positioned that as the ring 87 is urged forwards against the bias of the spring 93, the prongs 90 will engage the sloping faces of the slots 91 and will be rotated relative to the cylindrical extension 92 so that the fingers 88 will move each roller out of engagement with its corresponding ramp whereby the over-run clutch will become incapable of transmitting torque in either direction. A front over-run clutch 95 of well-known type is arranged between the power input shaft 27 and the centre member 73 such that the centre member 73 cannot rotate faster than the power input shaft 27.

A first fluid pressure operable cylinder 96 formed in the front diaphragm 29 supports a piston 97 having seals 98 and acting through a thrust bearing 99 on pins 100 axially slidable in bores in power input shaft 27 such that when pressurised oil is applied to the cylinder 96 the piston 97 will urge the pins 100 to act on the end plate 85 to engage the front multiplate clutch 74. The cylinder 96 is exhausted and the clutch 74 disengaged by axially operating helically coiled compression springs 101 acting between pressed steel thimbles 102, located in bores in the power input shaft 27, and a sheet metal plate 103 acting against shoulders formed on the pins 100.

A second fluid pressure operable cylinder 104 formed in the front diaphragm 29 supports a co-operating axial piston 105 acting on a brake member 106 slidably supported in a bore in the outer casting 28. The brake member 106 is returned, and the cylinder 104 is exhausted by helically coiled compression springs 107 reacting on the outer casing 28.

An outer tube 108 is supported by bearings 109, 110 from the inner tube 76. The outer tube 108 is formed near its rear end with a circumferential row of helical gear teeth 111 to constitute a front sun gear 112, being the fifth epicyclic element. The front end of the outer tube 108 is formed with external axially directed splines 113 drivingly engaged with corresponding splines formed in the hub of an axially-movable friction engaging member 114. Near the periphery of the member 114 an internal frusto-conical friction lining 115 is fastened and arranged such that when the member 114 is moved forwards the lining 115 engages a corresponding frusto-conical surface 116 formed on the outside of the cylinder 87 to clutch the power input shaft 27 to the axially-movable friction engaging member 114. An external frusto-conical friction lining 117 is fastened to the periphery of the member 114 such that when the second cylinder 104 is pressurised with operating fluid the brake member 106 is moved to the rear until a frusto-conical surface 118 formed thereon engages the friction lining 117 to bring the axially-movable friction engaging member 114 to rest. Three protrusions 119 integral with the hub of the axially-movable friction engaging member 114 are arranged such that, as the member 114 is moved into engagement with the power input shaft 27, the protrusions 119 will engage the ring 89 such that the over-run clutch 83 becomes disengaged.

An aluminium inserted member 120, held in a non-rotatable manner in a bore in the outer casing 28, is formed with axially operable third, fourth and fifth fluid pressure cylinders 121, 122 and 123 supporting corresponding pistons 124, 125 respectively. The cylinder 121 is closed by an end plate 126 located by a spring clip 127 in the outer casing 28. An extension of the piston 124 engages the axially-movable member 114 through two thrust bearings 128, 129. Axially operating helically coiled compression springs 130 react on the inserted member 120 to urge the piston 124 forwards whereby the third cylinder 121 is exhausted and the axially-movable member 114 is clutched to the power input shaft 27 with sufficient force to enable adequate torque to be transmitted from the power output shaft 46 to the power input shaft 27 in conjunction with the operation of the front over-run clutch 95, to start the vehicle engine when the vehicle is towed. When pressurised operating fluid is applied to the third cylinder 121 the axially-movable member 114 will be disengaged from the power input shaft 27 against the bias of the springs 130, but if fluid at the same pressure is applied at the same time also to the fourth cylinder 122, which has a larger operating area than the third cylinder 121, the member 114 will again be engaged with the power input shaft 27. Steel pins 131 slidable in axial bores in the inserted member 120 and in the extension of the piston 124 serve to prevent rotation of the latter.

A sixth axially directed fluid pressure operable cylinder 132 is formed in the outer casing 28 and supports a co-operating piston 133. When pressurised fluid is applied to the cylinder 132 the piston 133 engages a rear end plate 134 of a rear multiplate brake 135 whereby to engage the latter. The outer periphery of the rear end plate 134, a front end plate 136 and stationary plates of the brake 135 are all formed with splines engaging in corresponding axially directed splines formed in the outer casing 28. Three steel pins 137 riveted to the rear end plate 134, pass with clearance through slots in the stationary plates and the front end plate 136 and protrude forwards towards the piston 125. The areas of the pistons 125 and 133 are arranged such that when fluid is admitted to act on both pistons, the piston 125 will act on the pins 137 to retract the piston 133 and to disengage the brake 135.

Intermediate plates of the rear multiplate brake 135 are formed at their inner periphery with splines which engage corresponding axially directed splines formed on the outer surface of a steel annulus member 138 whose inner surface is formed with an integral circumferential row of helical gear teeth constituting an annulus gear 139, being the fourth epicyclic element.

Three equi-spaced first planet gears 140 mesh with the front sun gear 112. Each first planet gear 140 is formed integral with a smaller second planet gear 141 and they are together supported by bearings 142 for rotation on three steel pins 143. The pins 143 are carried by a front and a rear aluminium planet carrier member 144, 145 whose axial separation is determined by shoulders on the pins 143 against which they are pulled by screws 146, 147 which screw into the ends of the pins 143 and also hold the rear planet carrier member 145 to the steel disc 63. Each second planet gear 141 meshes with a circumferentially spaced third planet gear 148 which also meshes with the centre sun gear 80. Each third planet gear 148 is integral with a co-axial fourth planet gear 149 and they are supported by bearings 150 on three steel pins 151 having shoulders against which the front and rear planet carrier members 144, 145 are held by screws 152, 153. The annulus member 138 is axially and radially located for relative rotation by a bearing ring 154, pegged to the front planet carrier member 144, and by the rear planet carrier member 145. Each fourth planet gear 149 meshes with the rear sun gear 71.

An aluminium cap 155 is supported for rotation, by a bearing, on the outer tube 108 and is spigotted to radially locate the front planet carrier member 144, to which it is held by unseen screws.

Oil for lubricating the bearings and the gears is taken from the outlet of the pump 42 through unseen passages through the rear diaphragm member 30 and through a steel sleeve 156 pressed into the diaphragm member 30 to an oil collection groove 157 formed circumferentially in the power output shaft 46. Radial and axial drilling conduct the oil forwards into the hollow centre of the centre shaft 65 from whence it is dispersed through radial drillings in the centre shaft 65, the inner tube 76 and the outer tube 108. An oil collector ring 158 of sheet steel is trapped at its outer edge in a peened-over groove 159 in the front face of the aluminium cap 155 to guide oil into six plastic funnels 160 each feeding oil into hollow screws 146, 152 and through axial and radial drillings in the pins 143, 151 for lubricating the planet bearings and gears. The governor 161 is of a type well known to those versed in the art in which oil from the pump outlet is conducted through unseen passages to an oil collection groove 162 in the power output shaft 46 and thence through radial and axial drillings to the governor 161. In the governor 161 centrifugal force on a bob weight 163 is balanced by oil pressure which is adjusted by a spool valve 164 and oil at the balancing pressure is returned through further radial and axial drillings to an oil collection groove 165 from which the oil is returned to a control circuit.

Oil supply to and from the operating cylinders, the pump and the governor is conducted through unseen passages formed in the main casing 28 leading to an intermediate plate 166 lying between the lower face of the main casing 28 and a valve block 167 in bores in which operating control valves are slidably supported.

Figure 3:
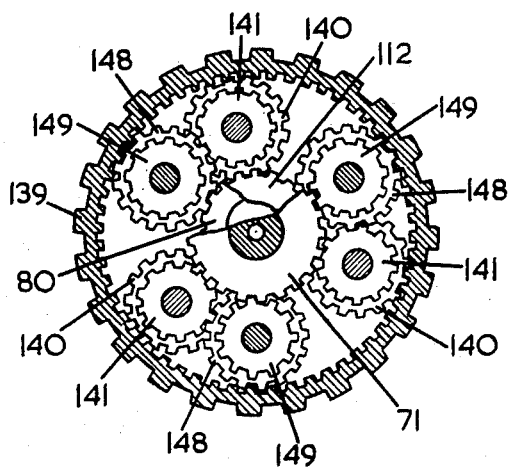
FIGURE 3 is a transverse section along the line 3—3 in FIGURE 2.

FIGURE 3 is a transverse section of the change-speed gearing showing only the gears to illustrate how the various gears intermesh. The front sun gear 112 meshes with the first planet gears 140, the second planet gears 141 mesh with the co-planar third planet gears 148 which mesh with the centre sun gear 80 and the annulus gear 139, and the fourth planet gears 149 mesh with the rear sun gear 71.

Figure 4:
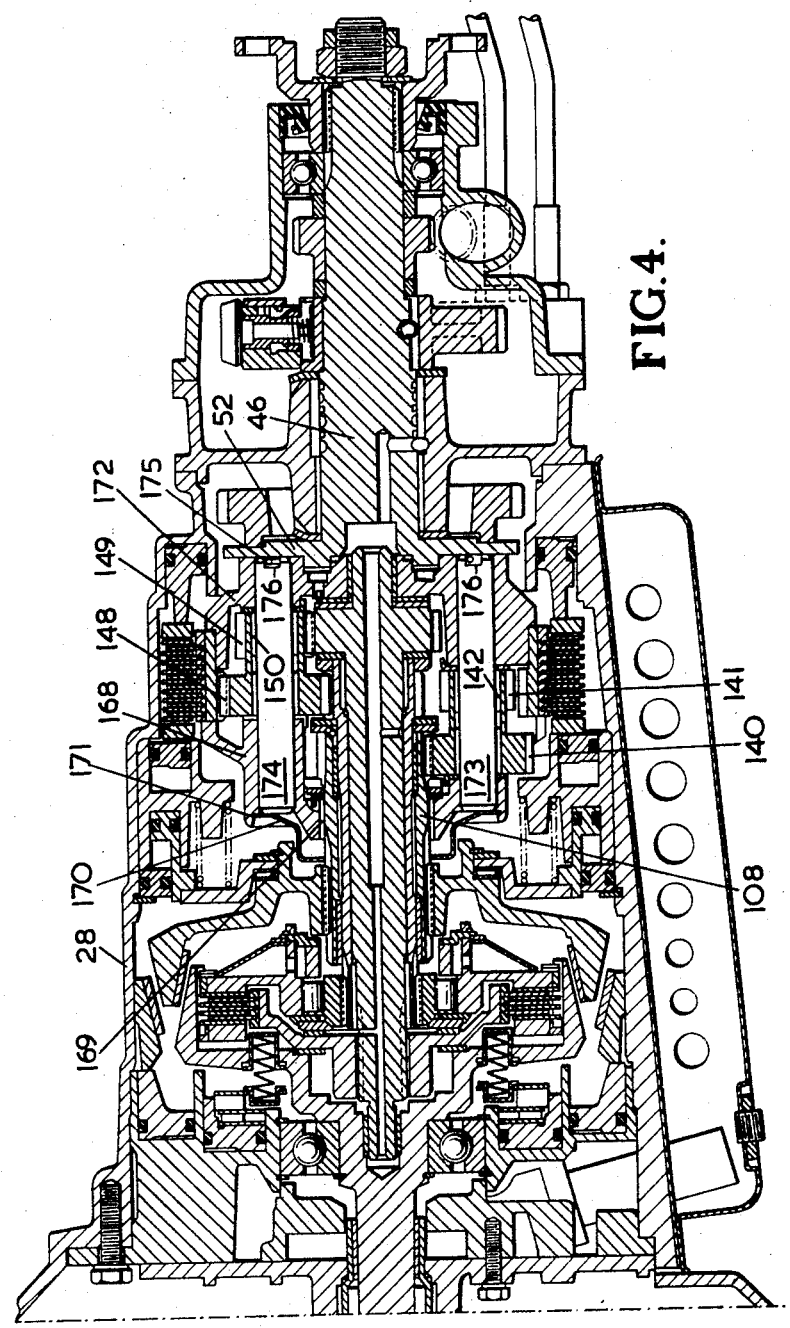
FIGURE 4 is a vertical section through a change-speed gearing of different construction from that shown in FIGURES 1 and 2.

FIGURE 4 illustrates an alternative embodiment to that illustrated in FIGURES 1 and 2. The construction and operation of all the components are effectively the same as in FIGURES 1, 2 and 3 with the following exceptions so that the same reference numerals are used where applicable. In FIGURE 4 the aluminium cap 155 and the steel disc 65, shown in FIGURE 2, are deleted and an aluminium front planet carrier member 168 extends inwards to hold the bearing 169 for rotation on the outer tube 108. A sheet metal oil collector ring 170 is trapped at its outer edge in a peened-over groove 171 in the front planet carrier member 168. Three bosses formed integral with the front planet carrier member 168 and unseen in FIGURE 4 extend intermediate the second and third planet gears 141 and 148 to abut three corresponding bosses formed integral with an aluminium rear planet carrier member 172 which is also extended inwards to hold the bearing 67 for rotation about the centre shaft 65. Studs extend axially through the said bosses on the front and rear planet carrier members 168, 172 and through the flange 52 formed integral with the power output shaft 46 whereby these members are fastened together. Steel pins 173, 174 for carrying the first, second, third and fourth planet gears 140, 141, 148 and 149 are without shoulders and are axially located between the oil collector ring 170 and the flange 52. Oil collected in the oil collector ring 170 flows into axial bores in the centre of the pins 173, 174 and thence through radial bores to the bearings 142, 150. The pins 173, 174 are prevented from rotation relative to the front and rear planet carrier members 168, 172 by a steel ring 175 which engages in a groove 176 formed across one end of each pin 173, 174.

The springs 107 and the steel pins 137, shown in FIGURE 2, are still present and operate in the same manner in the embodiment illustrated in FIGURE 4 but are located in positions circumferentially removed from the top of the change-speed gearing to reduce the height of the main casing 28.

Although the change-speed gearing 20 has been described as being driven by a fluid coupling 21, a hydrodynamic torque converter of any suitable type could be used in place of the fluid coupling 21. Furthermore, if the change-speed gearing is used in a vehicle where more than five forward ratios are required, such as in a lorry, an auxiliary change-speed gearing of suitable type of two or three ratios may be mounted in front of, or behind, the change-speed gearing 20 whereby ten or fifteen forward ratios may be obtained by using both change-speed gearings in combination.

The numbers of teeth on the three sun gears 71, 80 and 112, the four sets of planet gears 140, 141, 148 and 149, and the annulus gear 139 are chosen so that when the various drive ratios are selected, in the manner described below, one reverse gear, one neutral gear and five forward gear ratios will be obtained. Of the forward gears, the first affords the greatest reduction ratio and the remainder provide ratios of decreasing reduction ratio, to the fifth gear which is a direct drive.

When the engine is running, pressurised oil is supplied by the pump 42 to the control circuit which distributes the pressurised oil to the various operating cylinders as required.

Neutral gear is obtained when the third cylinder 121 is pressurised to withdraw the axially-movable friction engaging member 114 rearwards from engagement with the conical surface 118, and the fifth and sixth cylinders 123 and 132 are pressurised whereby the rear multiplate brake 135 is disengaged. Since the power input shaft 27 cannot drive the centre shaft 65 in a forwards direction through the over-run clutch 95, no drive torque is transmitted to the power output shaft 46.

First gear is obtained when the third cylinder 121 and the sixth cylinder 132 are pressurised so that the axially-movable friction engaging member 114 is disengaged and the rear multiplate brake 135 is engaged so that the annulus gear 139 becomes a reaction member to the casing. Drive is taken from the power input shaft 27 through the rear end plate 84, the over-run clutch 83 and the inner tube 76 to the centre sun gear 80 so that the planet carrier members 144, 145 and the affixed power output shaft 46 are driven at a reduction ratio. Under over-run conditions the over-run clutch 83 cannot transmit torque but it is taken through the over-run clutch 95 to the power input shaft 27 at the same gear ratio as second gear.

Second gear is engaged when the first, third and sixth cylinders 96, 121 and 132 are pressurised. As above the axially-movable friction engaging member 114 is disengaged and the annulus gear 139 is the reaction member clutched to the casing 28. The first cylinder 96 engages the front multiplate clutch 74 through which drive is taken and through the centre member 73 and the centre shaft 65 to the rear sun gear 71 which drives the fourth and third planet gears 149, 148 whereby the planet carrier members 144, 145 and the power output shaft 46 are driven at a reduction ratio. The same torque path obtains under over-run conditions.

Third gear is engaged after second gear by first pressurising the second cylinder 104 in addition to those pressurised above. This engages the brake member 106 with the axially-movable friction engaging member 114 to bring the latter to rest. This slows down the engine but meanwhile the fifth cylinder 123 is pressurised to disengage the rear multiplate brake 135 and the first cylinder 96 is exhausted of pressurised fluid to release the front multiplate clutch 74. Drive is taken through the over-run clutch 83 and the inner tube 76 to the centre sun gear 80 which drives the third, second and first planet gear sets 148, 141, 140 reacting on the front sun gear 112, which is held at rest, to drive the planet carrier members 144, 145 and the power output shaft 46 at a reduction ratio. On over-run the over-run clutch 83 cannot transmit torque but the power input shaft 27 is driven through the over-run clutch 95 at the fourth gear ratio.

Fourth gear is engaged when the first cylinder 96 is pressurised, in addition to those used for third gear, whereby the front multiplate clutch 74 is engaged through which drive is taken to the centre shaft 65. This drives the rear sun gear 71 which drives the fourth, third, second and first planet gears 149, 148, 141, 140 which react on the front sun gear 112 so that the planet carrier members 144, 145 and the power output shaft 46 are driven at a reduction ratio. On over-run the same drive path is used.

Fifth gear is engaged when the first, fourth, fifth and sixth cylinders 96, 122, 123 and 132 are pressurised. The first cylinder 96 engages the front multiplate clutch 74 to transmit drive to the gear sun gear 71, the fourth cylinder 122 engages the axially-movable friction engaging member 114 to the power input shaft 27 so that drive is taken to the front sun gear 112 and the fifth and sixth cylinders 123, 132 disengage the rear multiplate brake 135 so that the planet carrier members 144, 145 and the power output shaft 46 are driven at a direct drive ratio.

Reverse gear is engaged when the fourth and sixth cylinders 122, 132 are pressurised. The axially-movable friction engaging member 114 engages the power input shaft 27 to transmit drive through the outer tube 108 to the front sun gear 112. This drives the first and second planet gears 140, 141 in reverse rotation which in turn drive the third planet gears 148 in forwards rotation. These react on the annulus gear 139, which is held stationary by the rear multiplate brake 135, to drive the planet carrier members 144, 145 and the power output shaft 46 in reverse rotation. The forwards movement of the axially-movable friction engaging member 114 also disengages the over-run clutch 83, as described earlier, so that the centre sun gear 80 is not inhibited thereby from being driven in reverse rotation by the third planet gear 148.

The control of the pressurised fluid to the various operating cylinders will now be described with reference to FIGURE 5 which is of a diagrammatic form only. The details of construction of the components illustrated will be well known to those versed in the art.

The crescent pump 42 draws oil from the sump 38 through the suction pipe 41 and discharges it through passages 187 and 189 to a line modulator valve 188 in which a spool valve is axially biased upwards by a helically coiled compression spring 190 reacting against a plug 191 screw in the wall of the valve 188. The spool valve consists of an upper and a lower piston 192, 193 joined by a spindle 194. The plug 191 has an internal passage 195 into which a passage 197 is connected. The space between the pistons 192, 193 is vented to atmosphere through a hole 198. In use oil flows past the piston 192 and out through a passage 199. As the pressure in the system rises the downwards force on the piston 192 urges the spool valve downwards against the bias of the spring 190 until the piston 193 no longer blanks the end of the passage 189 so that part of the pump output is discharged to the sump through the hole 198. This prevents the pressure in the outlet passage 199 from rising further past a predetermined value. As a safeguard a pressure relief valve 201 is connected to a passage connected to the passage 199. In the relief valve 201 a ball 202 is held by a helically coiled compression spring 203 against a conical seat with a predetermined load such that when the oil pressure in the system exceeds a predetermined value the ball 202 is lifted off the conical seat and oil is discharged through a vent 204 to the sump.

A passage 205 conducts oil from the passage 199 to a throttle valve 206 in which a piston 207 is biased towards a blanking plug 208 by helically coiled compression spring 210. The spring 210 reacts against an auxiliary piston 211 against which a means 213 movable by the throttle pedal is arranged to operate. Oil at substantially constant pressure enters the throttle valve 206 through the passage 205. The pressure moves the piston 207 against the bias of the spring 210 to partly uncover a passage 209. As the pressure in the passage 209 rises, oil flows through a passage 212 into the space between the pistons 207, 211 which is vented to the sump through a hole 215 which is partly closed by the piston 207 as it is moved to the right. In this way the piston 207 adjusts its position until the pressure in the passage 209 is in a fixed relation to the bias of the spring 210.

As the throttle is opened, the means 213 moves to the left together with the piston 211 whereby the bias in the spring 210 is increased and the piston 207 will adjust its position until a new stabilised pressure is obtained in the passages 209, 212. By this means a pressure is generated in the passages 209, 212 in fixed predetermined relationship to the position of the throttle pedal, this is called throttle pressure.

Oil from the throttle valve 206 is distributed by the passage 209 to four cylinders 216, 217, 218, 219 wherein to act on one end of each of four corresponding pistons 220, 221, 222, 223 slidably supported therein. The other end of each piston 220, 221, 222, 223 abuts one of four complex piston assemblies 225 each supported in identical hysteresis valves 226, 227, 228, 229. The functioning of these valves need not be described in detail since they are described in our U.S. Pat. No. 3,119,414. The pistons 220, 221, 222 and 223 are of different cross-sectional areas decreasing in the order 220, 222, 221 and 223, so that for a given throttle pressure in the passage 209, corresponding to one throttle opening, the force urging the pistons to the right will be greatest on piston 220 and least on piston 223.

Selection of the gear ratios is made by a lever movable in a slot formed with two parallel limbs joined by a transverse limb. As the lever is moved along one limb it traverses positions labelled 1, 2, 3, 4 and D in which the first, second, third and fourth gear ratios may be manually selected respectively. The position marked D also lies in the traverse section along which the lever may be moved to the other limb of the track in which there are positions marked in order D, N, R and P corresponding respectively to ratio changing being automatic (drive), neutral being selected, reverse being selected and the parking lock being engaged. As the ratio selector lever is moved through the positions 1, 2, 3, 4, D an end of the lever, or means driven thereby, engages in a slot 230 formed in a manual selector valve 231 slidable in a valve block 232. As the lever is moved along the transverse slot, the member engaged in the slot 230 moves to engage in another slot 233 formed in an automatic selector valve 234 also slidable in the valve block 232 and arranged parallel to the manual selector valve 231 such that as the lever moves through the positions D, N, R, P the automatic selector valve 234 is moved.

The sequence of operation will now be considered of the control circuit when the selector valves 231, 234 are in the position marked D. If the engine is running and the throttle pedal is held open a fixed amount, the throttle pressure applied to the hysteresis valves through the line 209 will move all the pistons 216, 217, 218, 219 and the complex pistons 225 to the right. Oil at the pressure determined by the line modulator valve 188, called line pressure, is conducted along passaegs 235, 236 past the automatic selector valve 234, along a passage 237, past the manual selector valve 231 and along a passage 238 to the governor 161. As described earlier with reference to FIGURE 2, the governor generates an oil pressure in its outlet passage 239 which rises in a fixed predetermined relationship as the speed of the output shaft 46 rises. This is governor pressure.

Oil under governor pressure is fed through the passage 239 to act on identical areas of the hysteresis valve pistons 225 to urge them to the left but at rest the governor pressure is inadequate to do this. A passage 240 conducts line pressure oil from the passage 235 to the sixth cylinder 132 and passages 241, 242 conduct oil at line pressure from the passage 199 through the hysteresis valve 229, a passage 243, the hysteresis valve 228, a passage 244, the hysteresis valve 227, a passage 245, back through the hysteresis valve 227, through passages 246 and 247 to the third cylinder 121, whereby the first gear ratio is engaged, as described above. A passage 248 conducts oil to the lubrication system.

As the speed of the output shaft 46 increases, the governor pressure rises until the force it exerts on the hysteresis valve pistons 225 exceeds the force generated by the throttle pressure on the smallest piston 223 so that it, and its corresponding complex valve will move over to the left. This will allow oil under line pressure to flow from the passage 246, through a passage 249, the hysteresis valve 228, a passage 250, the hysteresis valve 229, a passage 251 to a first shuttle valve 252 in which two pistons 253, 254 of differential areas are joined by a spindle 255 and are urged by a helically coiled compression spring 256 to the right. Line pressure in the passage 251 acts on the piston 254 to move the shutlte valve to the left against the spring bias so that the passage 251 conduct oil into a passage 257 which leads to the first cylinder 96 so that the gear ratio is changed from first to second, as described above.

As the governor pressure rises further the value is reached at which the complex piston 225 in the hysteresis valve 227 is moved to the left. This disconnects the passage 246 from the passage 245 so that the pressure in the passages 247 and 251 falls to zero. Oil at line pressure is also enabled to pass from the passage 245 into the passage 258 and through a passage 259 into the hysteresis valve 226 from which it passes through a passage 260 to the second cylinder 104. Oil under line pressure also flows along the passage 258 to a second shuttle valve 261 in which two pistons 262, 263 joined by a spindle 264 are urged by a helically coiled compression spring 265 to the right. The oil acts on the piston 263 to urge it to the left against the spring bias so that oil can pass into a passage 266 to the fifth cylinder 123 so that the fourth gear ratio is engaged. However, oil passes from the passage 266 through a passage 267 to act on the same side of the piston 253 as the spring 256 in the first shuttle valve 252. This causes the valve to move to the right so that the first cylinder 96 becomes exhausted through a passage 268 and the transmission returns to the third gear ratio. The momentary engagement of four gear ratio is to enable a smooth gear change to be effected between second and third ratios. The stiffness of the spring 256 and the size of a restriction in the exhaust passage 268 are chosen to promote a smooth gear change.

As the speed of the vehicle, and consequently the governor pressure rise the value is reached at which the complex piston 225 in the hysteresis valve 228 moves to the left. This allows oil under line pressure to flow from passage 243, through the passage 250, the hysteresis valve 229 to the first shuttle valve 252 which moves to the left, as described above to allow oil to flow again to the first cylinder 96 whereby fourth gear ratio is engaged. The hysteresis valve also now connects the passage 243 to a passage 269 so that oil is fed to the fourth cylinder 122 although the piston in this cylinder is not yet moved.

As the governor pressure rises still further the complex piston 225 in the hysteresis valve 226 is moved to the left which disconnects the passage 260 from the passage 259 and the passage 260 is vented to the sump so that the second cylinder 104 is exhausted whereby the fifth gear ratio is engaged as described above.

By this control system the upwards changes in gear ratio are effected at appropriate speeds at a fixed throttle opening. The function of the hysteresis valves is to ensure that, at that throttle opening, each downwards change of gear ratio will occur at a lower vehicle speed than the corresponding upwards change. Furthermore, at a greater throttle opening each upwards or downwards gear ratio change will occur at an appropriately higher vehicle speed.

When the automatic selector valve 234 is moved to the N position the sixth cylinder 132 and the third cylinder 121 are energised as in first gear automatic but in addition oil flows from the passage 235, through a passage 270, through the second shuttle valve 261 and the passage 266 to the fifth cylinder 123. The passage 237 is also disconnected from the passage 236 so that no governor pressure is generated.

With the selector valve 234 in the R position, the sixth cylinder 132 is supplied through the passage 240, as above, and the passage 236 is connected to the passage 197 so that line pressure is applied to the underside of the piston 193 whereby the line pressure is increased so that the clutch and brake members are enabled to transmit the higher reaction torques obtaining in reverse drive ratio. The passage 270 is vented to the sump so that the fifth cylinder 123 is exhausted, and there is no governor pressure, as in the N position. Furthermore, a passage 271 is supplied with line pressure from the passage 235 so that oil at line pressure passes through a passage 272 to act on the right-hand end of the complex piston 225 in the hysteresis valve 228 whereby the piston is moved to the right so that the passage 243 is connected to the passage 269 and oil is fed to the fourth cylinder 122.

When the manual selector valve 231 is moved to the position marked 1, to engage first gear ratio, the passage 237 is disconnected from the passage 238 so that there is no governor pressure and since the automatic selector valve 234 is still in the position marked D first gear ratio is engaged and retained.

When the manual selector valve 231 is moved to the position marked 2, to engage second gear there is again no governor pressure but the passage 237 is connected to a passage 273 to apply line pressure to the right-hand end of the complex valve 225 of the hysteresis valve 229 to move the valve to the left to engage and retain second gear ratio.

When the valve 231 is moved on to the position marked 3, a further passage 274 is fed with line pressure to act on the right-hand end of the complex valve 225 in the hysteresis valve 227, whereby the complex valve is moved to the left to engage and retain third gear ratio.

On further movement of the manual selector valve 231, to the position marked 4, a further passage 275 is fed with line pressure which moves the complex valve 225, in the hysteresis valve 228, to the left to engage and retain fourth gear ratio.

What we claim as our invention and desire to secure by Letters Patent of the United States is:

1. An epicyclic change-speed gearing, including a power input shaft, a power output shaft, a first epicyclic element arranged for driving the power output shaft, a second epicyclic element, clutch means for optionally clutching said second epicyclic element to said power input shaft, a third epicyclic element, clutch means for optionally clutching said third epicyclic element to the power input shaft, a fourth epicyclic element, a stationary element, brake means for optionally braking said fourth epicyclic element to said stationary element, wherein the improvement comprises a fifth epicyclic element, an axially movable element connected to the fifth epicyclic element and optionally movable between a first position where it is clutched to the power input shaft, and a second position where it is braked to the stationary element through an intermediate position where it is disconnected from the power input shaft and the sationary element, a first planet gear meshing with the fifth epicyclic element, a second planet gear coaxial with the first planet gear and drivingly connected thereto, a third planet gear meshing with the second planet gear and the third epicyclic element, a fourth planet gear coaxial with the third planet gear and drivingly connected thereto and the fourth planet gear meshing with the second epicyclic element, the third and fourth planet gears constitute a pair of planet gears, and the fourth epicyclic element meshes with one of said pair of planet gears.

2. An epicyclic change-speed gearing, as in claim 1, in which the first epicyclic element is a planet carrier means, the second and third epicyclic elements are sun gears, the fourth epicyclic element is an annulus gear and the fifth epicyclic element is a sun gear.

3. An epicyclic change-speed gearing, as in claim 2, in which the clutch means for clutching the second epicyclic element to the power input shaft includes an over-run clutch arranged such that the second epicyclic element cannot rotate forwards faster than the power input shaft, and an optionally engageable friction clutch is connected in parallel with the over-run clutch.

4. An epicyclic change-speed gearing, as in claim 1, in which the clutch means for clutching the third epicyclic element to the power input shaft includes an over-run clutch which is optionally disengageable whereby either the power input shaft may not rotate faster than the third epicyclic element in a forwards direction, or the over-run clutch is completely disengaged.

5. An epicyclic change-speed gearing, as in claim 1, in which the elements for clutching the axially-movable friction engaging member to the power input shaft constitute a frusto-conical clutch.

6. An epicyclic change-speed gearing, as in claim 1, in which the elements for braking the axially-movable friction engaging member to the stationary element constitute a frusto-conical brake.

7. An epicyclic change-speed gearing, as in claim 1, in which a reverse drive ratio is provided when the fifth epicyclic element is clutched to the power input shaft, the second and third epicyclic elements are disconnected from the power input shaft and the fourth epicyclic element is braked to the stationary element.

8. An epicyclic change-speed gearing, as in claim 1, in which the means for braking the fourth epicyclic element to the stationary element includes a first fluid pressure operable piston for generating a braking force and a second fluid pressure operable piston for generating a greater force in opposition to that generated by the first piston whereby the fourth epicyclic element may be braked by pressurising the first piston or may be unbraked by either unpressurising both pistons or by pressurising both pistons simultaneously.

9. An epicyclic change-speed gearing, as in claim 1, arranged to be operable to provide five forward drive ratios.

10. An epicyclic change-speed gearing, as in claim 1, arranged to be operable to provide five forward and one reverse drive ratios.

11. An epicyclic change-speed gearing, as in claim 1, wherein the improvement comprises that a means to be operable by the driver of the vehicle is arranged to be engaged with a first fluid pressure selector valve whereby to move the latter in a straight line between a sequence of positions each corresponding to the selection of a different gear drive ratio to a position in which the engagement of the various gear drive ratios are effected automatically, and in the latter position the means is movable out of engagement with the first fluid pressure selector valve and into engagement with a second fluid pressure selector valve, and the means is movable to move the second fluid pressure selector valve between a sequence of positions in which neutral drive, reverse drive and the engagement of a parking lock are engaged in turn.

References Cited

UNITED STATES PATENTS

| | | | |
|---|---|---|---|
| 2,509,820 | 5/1950 | Hobbs | 74—763 |
| 2,671,359 | 3/1954 | Scheiter | 74—763 X |
| 2,892,363 | 6/1959 | Dodge | 74—761 X |
| 3,124,974 | 3/1964 | Hobbs | 74—759 |
| 3,160,030 | 12/1964 | Wickman | 74—761 |
| 3,164,036 | 1/1965 | Lamburn et al. | 74—781 |
| 3,295,394 | 1/1967 | Whateley | 74—781 |

DONLEY J. STOCKING, Primary Examiner

THOMAS C. PERRY, Assistant Examiner